(No Model.)

J. D. ADAMS.
BUSHING FOR PULLEYS, JOURNALS, &c.

No. 592,504. Patented Oct. 26, 1897.

Witnesses
C. M. Catlin.
Thomas Ford

Inventor
James D. Adams,
By Benj. R. Catlin
Attorney

THE NORRIS PETERS CO., PHOTO-LITHO., WASHINGTON, D. C.

UNITED STATES PATENT OFFICE.

JAMES D. ADAMS, OF WABASH, INDIANA.

BUSHING FOR PULLEYS, JOURNALS, &c.

SPECIFICATION forming part of Letters Patent No. 592,504, dated October 26, 1897.

Application filed February 25, 1897. Serial No. 625,010. (No model.)

*To all whom it may concern:*

Be it known that I, JAMES D. ADAMS, a resident of Wabash, in the county of Wabash and State of Indiana, have invented certain new and useful Improvements in Bushings for Pulleys, Journals, and the Like; and I do hereby declare the following to be a full, clear, and exact description of the invention, such as will enable others skilled in the art to which it pertains to make and use the same.

The invention relates to a bushing or core for pulleys, wheels, axle and shaft bearings, and the like, and has for its object a durable antifriction device adapted for use wherever a piece of mechanism rotates on a shaft—as, for example, an idle or loose pulley—or wherever a shaft or axle turns in bearings—as, for example, a shaft in journal-boxes.

The invention consists in the construction hereinafter described and particularly pointed out.

Figure 1:
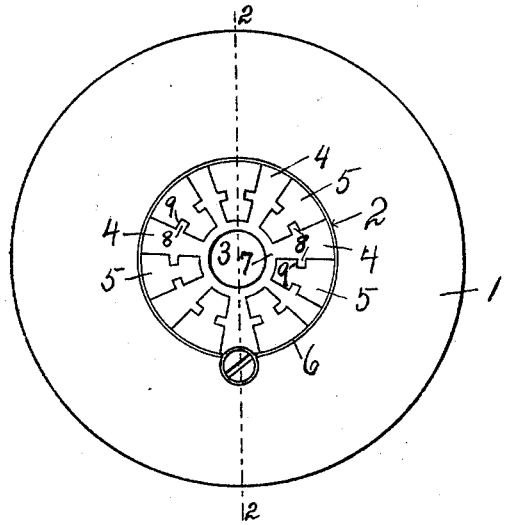
Figure 2:
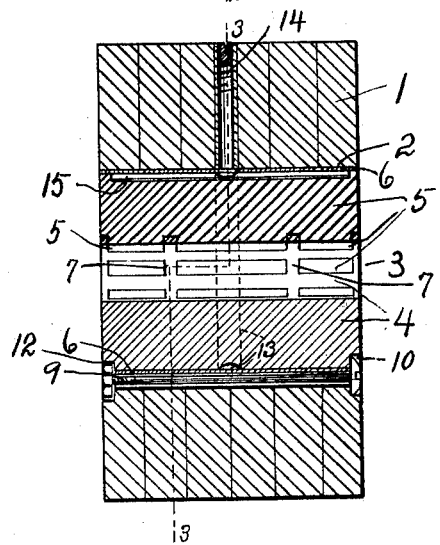
Figure 3:
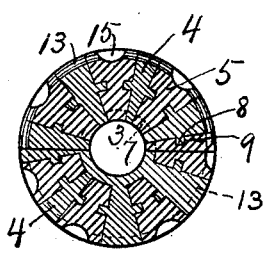

In the accompanying drawings, Figure 1 is an elevation of a pulley with the improved bushing. Fig. 2 is a longitudinal section on line 2 2 of Fig. 1. Fig. 3 is a transverse section of the bushing on bent line 3 3 of Fig. 2, the horizontal part of the plane of section being indicated by a dark line in said Fig. 2 and an uncut half of a metal ring indicated by dotted lines.

Numeral 1 denotes the body of a pulley having a central opening (indicated at 2) adapted to receive a core or bushing consisting of sets of sections comprising series of frusto-segmental pieces of metal and wood arranged in alternate order about a cylindrical opening 3 to receive a shaft, said metal and wood segments being indicated by 4 and 5, respectively. A tube of metal or other material interposed between the bushing and the body of the pulley in some cases is denoted by 6. This tube covers an oil or lubricator receptacle on the exterior of the bushing, consisting of a series of grooves hereinafter described, and prevents the oil from passing into the main body of the pulley.

As illustrated in the present instance, the metal portion of the bushing is made in skeleton form, the several segmental pieces being joined at their inner edges by rings 7. As shown in Fig. 2, these rings are four in number, one at each end of opening 3 and two intermediate. They are all connected by bars 4 integral therewith and situated lengthwise of the tubular opening 3 and extending to the periphery of the bushing, as shown in Fig. 3. The rings and bars thus united form a skeleton cylinder having rectangular openings in its inner periphery, into which are extended portions of the wooden segments 5. The outer parts of said segments occupy the spaces between the metal segments 4, and together with them constitute the bushing. Each wooden segment 5 is fixed between metal segments, and for this purpose wings or flanges 8 may be made to engage grooves 9 in the wood.

In case of metals having a low point of fusion the wooden segments may be arranged as in the bushing and the metal poured between them, suitable provision being made to insure an approximately correct form, and the article can be completed by the use of a lathe or suitable tool.

The rings 7 are embedded in the wood, the inner surface of which between the metal parts is flush with the interior surface of the latter, so that in use both materials are in contact with the shaft or the like embraced by the bushing.

9 denotes a screw-bolt provided with suitable head and nut and adapted to hold the bushing in the pulley. The metal segment is cut away at 10 and 12 to receive the head and nut, respectively, of the bolt 9.

13 is a circumferential groove communicating with a conduit 14, adapted to be closed by a plug or in any suitable manner.

15 indicates branch grooves formed lengthwise in the exterior of the wood segments, but terminating short of their ends. These grooves together constitute a reservoir for a lubricant which may be supplied through the conduit 14. Other forms may be given to these grooves or lubricant-receptacles and their number and extent may be varied; but it is preferred to distribute them about the entire outside of the bushing, substantially as represented. The tube 6 prevents the lubricant moving outwardly from the grooves.

A part of the segments being made of wood or other material having capillary passages the lubricant gradually finds its way to the interior of the bushing, this action being promoted by the heat due to the friction on the shaft.

The above-described bushing supplied with a lubricant, as stated, requires little attention and will run many months without appreciable wear.

The alternate arrangement of materials of different densities like Babbitt metal and wood, both bearing upon the shaft, I have found by continued practice to greatly reduce both friction and wear.

It appears that minute metal or other particles adapted to grind the metal surfaces are arrested by the pores of the wood bearing-surface and become impacted therein in manner to render them less injurious than otherwise.

Another advantage of the improvement is that the bushings can be renewed easily and quickly by unskilled workmen, and thus a great saving in time and labor effected, which may be a matter of great practical importance in the running of machinery. For the above purpose the bushings may be made of standard sizes and kept in stock by the users.

Babbitt metal and hard wood are preferred for the segmental pieces, but any suitable materials having different densities, and one of which is porous or provided with capillary passages, may be used. Soft wood, leather, or other porous material may be arranged alternately with segmental pieces of brass or other alloy or metal.

It is not essential in all cases that the core be made of segmental pieces, or, if so made, that the pieces be of unlike material.

It is not essential that the exterior of the bushing be cylindrical, as shown, but any desired form may be employed. Neither is the improvement confined to making the bushing entire by the permanent connection of all of the segmental pieces, and it may be split as pulleys are in practice.

The means of securing the core in the bushing, journal-box, shaft-bearing, wheel, or other structure may be varied in any suitable or desired manner.

I am aware that a pulley has been provided with a lubricator-reservoir and with concentric perforated cylindrical bushing adapted to distribute the lubricating material upon an inclosed shaft and also that a cylindrical removable bushing made entirely of metal and provided with lubricating-holes filled with wooden plugs has been proposed, and such matters are not of my invention. My improvement comprises a bushing made of wedge-like sections of distinct materials, some of which have a capillary texture, and each having the form of truncated segments, said segments constituting an imperforate cylinder, a part of the segments being separable and renewable. The porous segments are provided with longitudinal grooves in their exterior, which are connected by a circumferential groove, cutting both the porous and non-porous segments. Said grooves are inclosed by a tube that surrounds the bushing. My invention relates to these and other specific features herein pointed out.

Having described my invention, what I claim is—

1. A pulley or the like, a detachable core or bushing for the same comprising sets of alternate longitudinal sections made of different materials, one of which sets has capillary passages, said sections extending the length of the bushing and having their inner faces flush, or continuous with each other circumferentially, and provided with a lubricant-receptacle extended transversely around the exterior of the bushing, and a passage extending from the exterior of the pulley for charging said receptacle, substantially as described.

2. A detachable core or bushing for a pulley or the like comprising sets of alternate longitudinal sections made of different materials, one of which sets has capillary passages, said sections extending the length of the bushing and having their inner faces flush, or continuous, with each other circumferentially, and means for fastening the core in the pulley, said means consisting of a screw-bolt situated in the body of the pulley and having a head and securing-seat seated partly in the pulley and partly in the metal part of the core, substantially as described.

3. A core or bushing for a pulley or the like comprising a metal skeleton consisting of segmental sections joined by rings and wooden sections fitted between the metal sections, said sections extending the length of the bushing and having their inner faces flush circumferentially with each other and with the rings, substantially as described.

4. A core or bushing for a pulley or the like comprising a metal skeleton consisting of segmental sections joined by rings 7 and segmental wooden sections fitted between the metal sections, said sections having their inner faces flush with each other and with the rings circumferentially and having lateral wings or ribs fixed to a part of the sections and entered in recesses or slots in the adjoining sections, substantially as described.

5. A detachable core or bushing for a loose pulley or the like, comprising longitudinal segmental sections each having an inner face flush with those adjoining and the whole series adapted to bear on a shaft, a separable envelop surrounding the sections and means for detachably holding the envelop on the sections, substantially as described.

6. A detachable core or bushing for a loose pulley or the like, comprising longitudinal segmental sections each having an inner face flush with those adjoining and the whole series adapted to bear on a shaft, a separable envelop surrounding the sections, and means for detachably holding the envelop on the sections to confine a lubricating fluid, said sections having lubricating-passages, substantially as described.

In testimony whereof I have signed this specification in the presence of two subscribing witnesses.

JAMES D. ADAMS.

Witnesses:
THOMAS E. WHITESIDE,
OLIVER H. BOGUE.